US006996602B2

(12) United States Patent
Slater

(10) Patent No.: US 6,996,602 B2
(45) Date of Patent: Feb. 7, 2006

(54) SERVER-SIDE PAGE TABLE FRAMEWORK FOR CLIENT APPLICATION DEFINITION AND EXECUTION

(75) Inventor: Dennis Slater, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 668 days.

(21) Appl. No.: 10/063,017

(22) Filed: Mar. 12, 2002

(65) Prior Publication Data

US 2003/0023676 A1    Jan. 30, 2003

Related U.S. Application Data

(60) Provisional application No. 60/299,220, filed on Jun. 18, 2001.

(51) Int. Cl.
G06F 15/16 (2006.01)
(52) U.S. Cl. .................. 709/203; 709/205; 709/223
(58) Field of Classification Search ............... 709/201, 709/203, 219, 246, 205, 223; 715/513, 522, 715/523; 707/10
See application file for complete search history.

(56) References Cited

U.S. PATENT DOCUMENTS

| | | | |
|---|---|---|---|
| 5,928,323 A | 7/1999 | Gosling et al. | |
| 6,012,098 A | 1/2000 | Bayeh et al. | |
| 6,049,664 A | 4/2000 | Dale et al. | |
| 6,083,276 A | 7/2000 | Davidson et al. | |
| 6,098,093 A | 8/2000 | Bayeh et al. | |
| 6,105,063 A | 8/2000 | Hayes, Jr. | |
| 6,105,066 A | 8/2000 | Hayes, Jr. | |
| 6,108,712 A | 8/2000 | Hayes, Jr. | |
| 6,151,599 A | 11/2000 | Shrader et al. | |
| 6,151,700 A | 11/2000 | Fox | |
| 6,167,522 A | 12/2000 | Lee et al. | |
| 6,185,730 B1 | 2/2001 | LeBlanc | |
| 6,205,476 B1 | 3/2001 | Hayes, Jr. | |
| 6,209,125 B1 | 3/2001 | Hamilton et al. | |
| 6,212,564 B1 | 4/2001 | Harter et al. | |
| 6,374,247 B1 * | 4/2002 | Gebauer | 707/10 |
| 6,446,117 B1 * | 9/2002 | Gebauer | 709/217 |
| 6,615,258 B1 * | 9/2003 | Barry et al. | 709/223 |
| 6,693,638 B1 * | 2/2004 | An et al. | 345/503 |

(Continued)

OTHER PUBLICATIONS

Web Site: http://www.npac.svr.edu/users/gcf/HPcc/HPcc.html Dec. 7, 1997, "Hpcc as High Performance Commodity Computing", Geoffrey C. Fox et al, 29 pp.

(Continued)

Primary Examiner—Marc D. Thompson
Assistant Examiner—Rainier Suazo
(74) Attorney, Agent, or Firm—David B. Kelley; Brooks & Kushman

(57) ABSTRACT

A server-side method and system are provided for defining and executing client computer applications. Aspects of preferred embodiments include defining a page table associated with a client computer application. The page table includes, for one or more application pages, a current page value, an action value, a process value and a next page value. Preferred embodiments additionally include receiving a request from a client that includes request data, an indication of a current page value and an action value. The preferred embodiments also include processing the request data. The process is defined in the page table as a process value corresponding to the current page value and action value received in the request. Additionally, the preferred embodiments include returning a response to the request. The response is defined in the page table as the next page value corresponding to the current page value and action value received in the request.

15 Claims, 2 Drawing Sheets

U.S. PATENT DOCUMENTS

2002/0112114 A1 * 8/2002 Blair et al. .................. 711/100

OTHER PUBLICATIONS

Web Site: http://www.java-pro.com/upload/fre... pro/2000/06jun00/gb0006/gb0006.asp Jun. 2000, JAVAPro, "Build an E-Commerce Shopping Cart", 9 pp.

Web Site: http://review.software.ibm.com/developer/library/frameword2/understanding.html IBM, "IBM Application Famework for e-business—Understanding technology choices for your Web applications", 29 pp.

Web Site: wysiwyg://5http://222-4.ibm.com/software/ebusiness/docs/understand.html IBM Application Framework for e-business, 18 pp.

Web Site: http://www.dialogclassic.com/main.vmgw DialogClassic Web (tm), 21 pp.

Website, "The Jakarta Project", http://jakarta.apache.org. struts, 3 pages.

Website, Novell DevNote-"WebSphere Components", ©Dec. 1999, http://developer.novell.com/research/devnotes/1999/December/03/dpv.htm, 6 pages.

* cited by examiner

US 6,996,602 B2

SERVER-SIDE PAGE TABLE FRAMEWORK FOR CLIENT APPLICATION DEFINITION AND EXECUTION

CROSS REFERENCE TO RELATED APPLICATIONS

This application claims the benefit of U.S. provisional application Ser. No. 60/299,220, filed Jun. 18, 2001.

BACKGROUND OF INVENTION

1. Field of the Invention

The present invention relates generally to computer application development and, more particularly, to a page table framework for client application definition and execution.

2. Background Art

Conventional enterprise application development and hosting involves a variety of independent and redundant development tasks. For example, the development of a simple hyper-text markup language (HTML) application involves the development of an HTML start page, the development of a server-side handler to process a client's HTTP request when the start page is submitted to the server, the development of a processor to process the request, and the development of a response handler to either return a new page to the client or execute some other action.

Commonly, server-based enterprise applications involve hundreds of pages, processes, handlers, etc. each of which must be independently developed and implemented. To the extent that these activities include overlapping tasks, processes, etc., this independent development is often unstandardized, redundant and inefficient.

SUMMARY OF INVENTION

The present invention is a server-side page table framework that enables efficient client or web application development and implementation (e.g., application definition, execution, etc.). One object of the present invention is to reduce redundant, unstandardized and decentralized application coding across an enterprise. An advantage of the present invention is central method definition and execution. Central method definition and execution enables an enterprise to update, replace or otherwise enhance method logic at a central location, thereby automatically enhancing each session of enterprise-wide data processing that calls the centrally-defined methods during routine processing.

A preferred method embodiment of the present invention includes defining a page table associated with a client computer application. The page table includes, for one or more application pages, a current page value, an action value, a process value and a next page value. The preferred method embodiment additionally includes receiving a request from a client computer wherein the request includes request data, an indication of a current page value and an action value. The preferred method embodiment also includes validating the request data and transforming the request data into a model format for processing. Processing is defined in the page table as the process value corresponding to the current page value and action value received in the request. Additionally, the preferred method embodiment includes transforming response data into a view format and returning a response to the request wherein the response is defined in the page table as the next page value corresponding to the current page value and action value received in the request, and includes the response data.

Validation and transformation methods may be defined in the page table. The preferred method embodiment may additionally include merging response data with a pre-defined page template. The template may be defined in the page table. The client application may be an Internet/intranet application.

More than one process value may be is defined for an application page. Additionally, at least a portion of the request, response or intermediate processing data may be stored in context and made available to more than one process.

A perferred system embodiment of the present invention includes a computer system for defining and executing one or more client computer applications. The preferred server system embodiment is configured to receive input defining a page table associated with a client computer application wherein the page table includes, for one or more application pages, a current page value, an action value, a process value and a next page value. The preferred system embodiment is additionally configured to receive input containing a request from a client wherein the request includes request data, an indication of a current page value and an action value. The system is also configured to validate the request data and transform the request data into a model format for processing. The preferred system embodiment is also configured to process the request data. Processing is defined in the page table as the process value corresponding to the current page value and action value received in the request. The preferred system embodiment is additionally configured to transform response data into a view format and present output to the client computer containing a response to the request wherein the response is defined in the page table as the next page value corresponding to the current page value and action value received in the request, and includes the response data.

Validation and transformation methods may be defined in the page table. The preferred system embodiment may be additionally configured to merge the response data with a pre-defined page template. The template may be defined in the page table.

The preferred system embodiment may be additionally configured to execute more than one process on request data associated with an application page, and wherein the more than one process to be executed is defined in the page table. The preferred system embodiment may be additionally configured to store at least a portion of the request, response or intermediate processing data in context such that the context data is available for more than one process.

Method and system embodiments of the present invention are particularly well suited for financial data management applications including applications for maintaining and processing account data, credit account information, purchasing, receivables, etc.

The above objects and other objects, features, and advantages of the present invention are readily apparent from the following detailed description of the preferred embodiments when taken in connection with the accompanying drawings.

BRIEF DESCRIPTION OF DRAWINGS

FIGS. 1 and 2 are for illustrative purposes and are intended to demonstrate preferred embodiments of the present invention. Those of ordinary skill in the pertinent art recognize that the preferred embodiments may be adapted or rearranged to best fit a particular implementation of the present invention.

DETAILED DESCRIPTION

Figure 1:
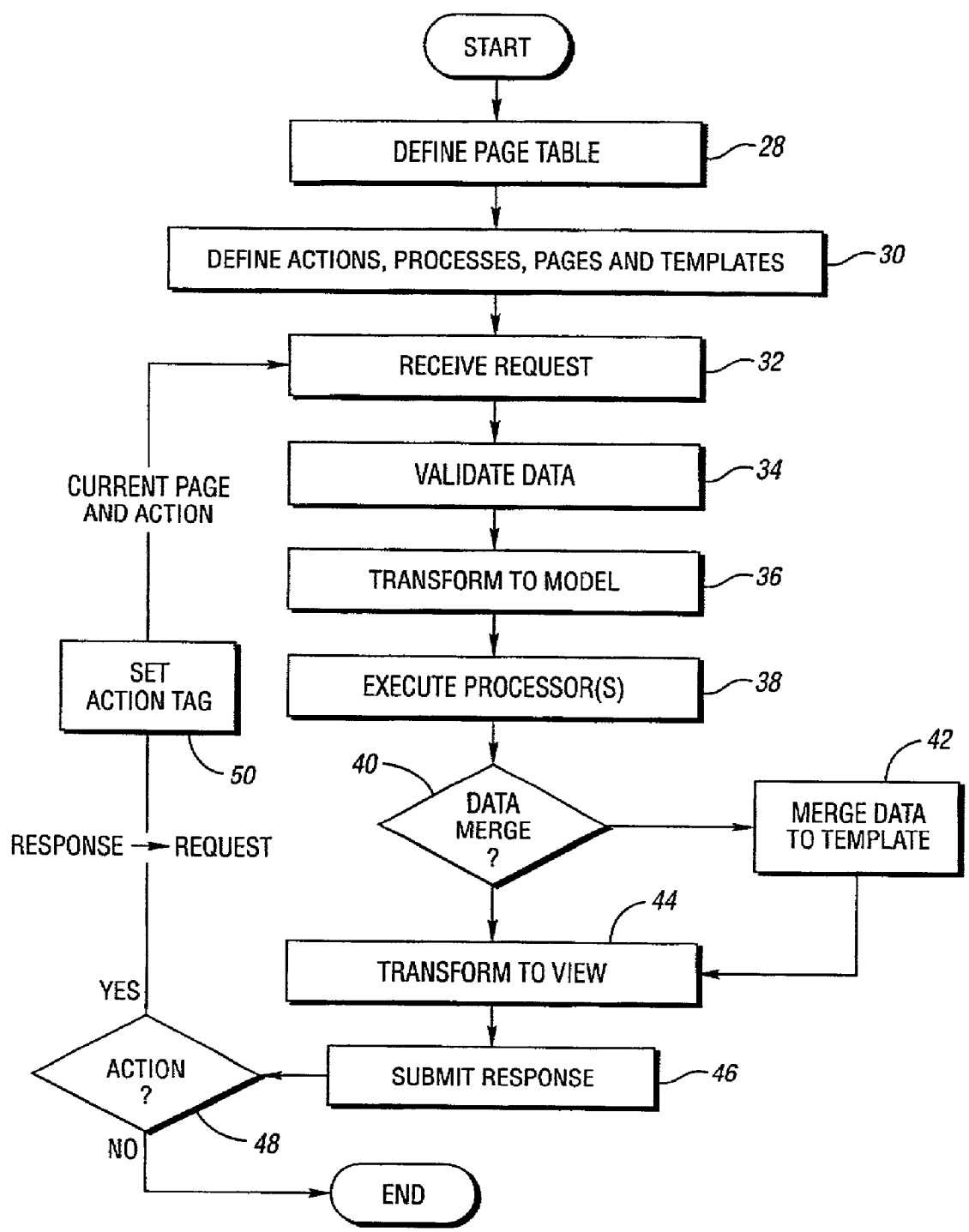
FIG. 1 is a system diagram illustrating a preferred system architecture for implementing the present invention.

In accordance with a preferred embodiment of the present invention, a thin client or web application is an application where a majority of the business logic and data processing is performed on a server. The client is typically only used to interact with a user of the system. Clients typically interact with the server via HTTP or HTTPS. Examples of clients include but are not limited to Microsoft Internet Explorer, Netscape Navigator and Web TV.

In further accordance with a preferred embodiment of the present invention, client navigation and request processing (e.g., HTTP request, etc.) is defined and governed by a server-side page table. Table 1 is a table-based representation of a hypothetical page table in accordance with a preferred embodiment of the present invention. Notably, the content of Table 1 is generic and arbitrarily-selected for purposes of illustration. The actual organization, architecture and content of a page table, however, can be adapted or modified to best fit a particular implementation of the present invention.

Utilizing a page table, a developer defines application attributes including without limitation the pages associated with an application, actions to be executed on each page, processors to be called to execute those actions, and navigation (i.e., new pages to be returned in a response to the HTTP request).

TABLE 1

| Page | Action | Processor(s) | Next Page |
| --- | --- | --- | --- |
| NULL | NULL | NULL | START_PAGE |
| START_PAGE | RETRIEVE | RETRIEVE | STATUS_PAGE |
| START_PAGE | UPDATE | RETRIEVE; UPDATE | STATUS_PAGE |
| START_PAGE | NEW | RETRIEVE; DELETE | STATUS_PAGE |

In one embodiment of the present invention, the server-side page table is implemented in XML.

For each page defined in the page table, the developer identifies the server-side location of a corresponding output file (e.g., HTML file, etc.). Preferably, all pages in a given application conform to a standard interface format. As discussed in greater detail below, the corresponding output file may comprise a template to which data is merged.

Each output file designated in the page table contains one or more hidden tags (e.g., HTML tags, etc.) having attributes for identifying information such as the current page, an action to be executed (defined at the client), a request type, etc. For example:

```
<INPUT type= "hidden" name= "ACTION" value= "RETRIEVE"> </INPUT>
<INPUT type= "hidden" name= "PAGE" value= "START_PAGE"> </INPUT>
<INPUT type= "hidden" name= "REQUEST" value= "PAGE_TABLE"> </INPUT>
```

In addition to page, action, processor and next page, server-side data transformation and validation methods may also be specified in the page table. In accordance with a preferred embodiment of the present invention, transform-to-model transformation methods transform page field data to a standard or predefined model format for subsequent server-side processing. Validation methods validate submitted field data. Transform-to-view transformation methods transform data from the standard model format to a client-side presentation format. Preferably, data transformation and validation methods are selected and called from a server-side library of standard methods.

TABLE 2

```
<PageTable>
  <PageProperties>
    <Page name="START_PAGE" class="DefaultPage" template="start.html"/>
    <Page name="STATUS_PAGE" class="DefaultPage" template="status.html"/>
  </PageProperties>
  <PageEntry page="null" action="null" processor="null" nextPage="START_PAGE"/>
  <PageEntry page="START_PAGE" action ="RETRIEVE" processor="RETRIEVE" nextPage="STATUS_PAGE"/>
  <PageEntry page="START_PAGE" action="UPDATE" processor="RETRIEVE;UPDATE" nextPage="STATUS_PAGE"/>
  <PageEntry page="START_PAGE" action="NEW" processor="RETRIEVE;NEW" nextPage="STATUS_PAGE"/>
</PageTable>
```

Table 2 contains an example page table in HTML format. Notably, the content, arrangement and language of the of the generic page table illustrated in Table 2 may be rearranged, modified and/or supplemented to best fit a particular application or implementation.

A person browsing an application page (i.e., a page contained within the page table) presents input to the thin-client computer to specify a predefined action to be performed on the current page data. Notably, there is no limit to the number of application pages or actions that may be performed on those pages. Via the page table, the application developer defines the application pages and the navigation of the corresponding business logic available to the browsing client.

In accordance with a preferred embodiment of the present invention, actions (and their corresponding processors) are selected and called from a central library of standard actions and processors. Alternately, a developer can define and code non-standard actions and processors and designate those actions and processors in the application page table.

Upon selecting an action for a given application page, client-side script (i.e., application developer script) automatically updates the action tag at the client to reflect the selected action and submits a request (e.g., HTTP request, etc.) to the server. The script sets the hidden action to the appropriate value.

At the server, a request handler receives the request and abstracts the current page and action tag attributes. If no current page and action attributes are present, the server presents the client with a default response (e.g., HTTP response, etc.).

Based on the current page and action attributes, the server performs request processing as defined in the page table. Request processing begins with data transformation and validation.

Once validation and transformation are complete, one or more classes (e.g., Java classes, etc.) associated with the first action processor are dynamically loaded and executed. In accordance with a preferred embodiment of the present invention, each class calls only one execute method to execute the process defined by the developer in the page table. Processes include but are not limited to database activities such as updating and retrieving data, manipulating data, deleting data, and generating external events such as e-mail, etc.

Multiple processors may be implemented for a single action. Multiple actions may be implemented for a single page. The overall application architecture and navigation is defined within the page table.

Context allows developers to define how information is passed from one processor to another, or from one processor to a page. Context is maintained on the server and defined by the developer in the page table. In accordance with a preferred embodiment of the present invention, context is passed to the processor in the execute method as an argument.

Types of context include but are not limited to original context, working context, request context and session context. Original context stores all of the data submitted to the server during a request. This context is typically read-only. Working context is typically valid for one request. This is the primary communication channel for processors and pages. The request context may be available for more than one request—its duration is defined by the developer in the page table. Session context is available for the client user's entire session.

Exceptions that occur during transformation, validation and processing are preferably stored in context. Throughout processing, a name-value list is developed and maintained in context for use in a subsequent template merge response, if applicable.

Following processing, a response (e.g., HTTP response, etc.) is prepared. For a given page and action, the page table defines the next page the page or template to be returned to the client in response to the client's earlier request. The next page may contain static or dynamic content (e.g., HTML template) to be merged with context data (i.e., name-value list data) or other data. For templates, the developer defines the server-side template using custom tags to identify data and process locations in the document. In accordance with a preferred embodiment of the present invention, complex server side merging such as file includes are supported by the server and corresponding HTML templates.

Once the template is merged with the appropriate data, the resulting page is transformed from the model format to the proper view format by the transform-to-view method the developer specified in the page table. Finally, the transformed page is output served to the client in a response to the client's original request.

Figure 2:
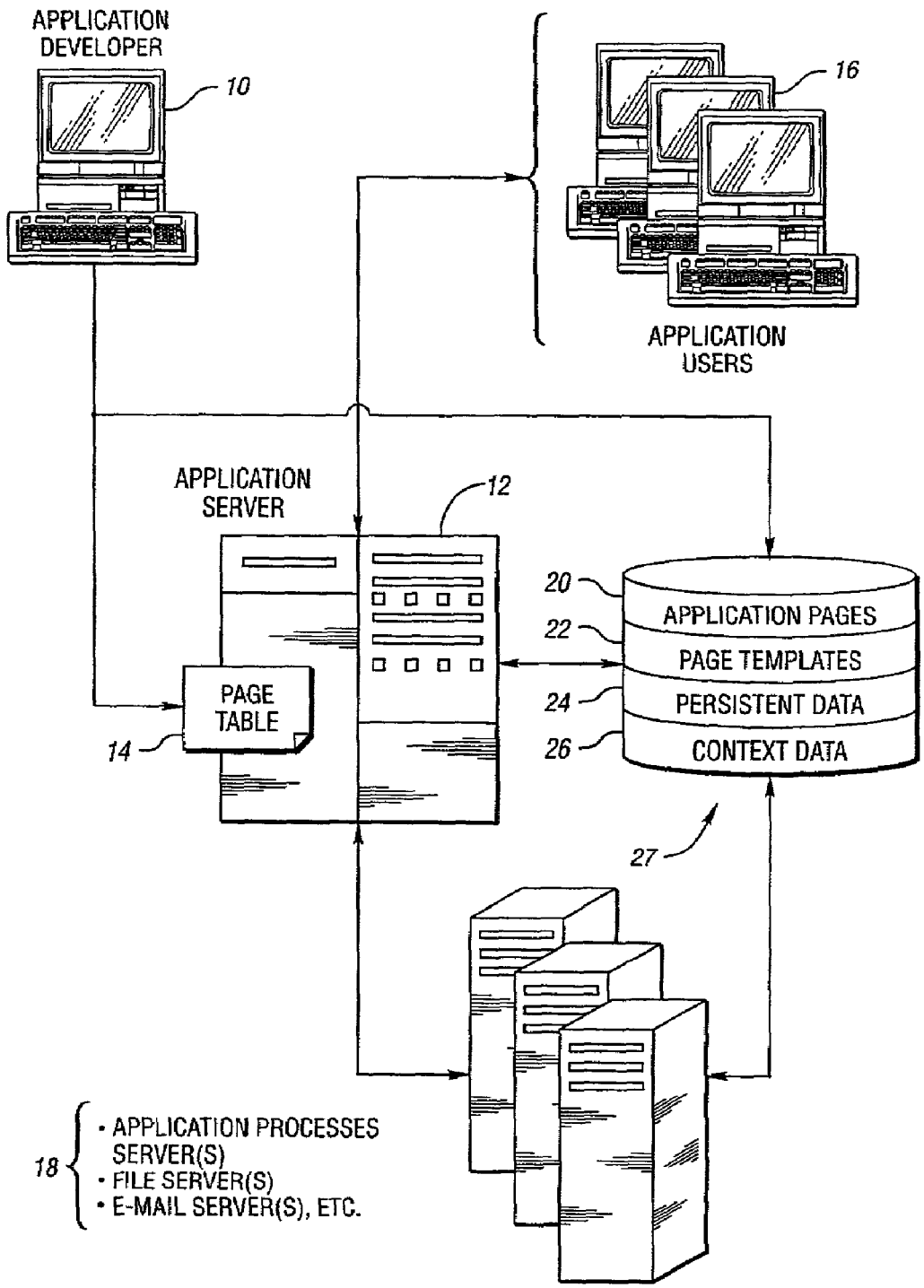
FIG. 2 is a block flow diagram illustrating a preferred methodology for implementing the present invention.

Referring now to FIGS. 1 and 2, a block flow and system diagram, respectively, illustrate a preferred implementation of the present invention. Notably, elements of the preferred implementation shown in FIGS. 1 and 2 may be rearranged, omitted or expanded to best fit a particular implementation of the present invention.

The preferred implementation begins with an application developer 10 accessing a server 12 (e.g., HTTP server, etc.) to define the page table 14 associated with a thin-client application, as represented in block 28. Page table definition is discussed in greater detail above. Additionally, the developer defines and/or develops application processes, actions, individual pages and templates associated with the application, as represented in block 30. Application pages and templates are preferably stored in volatile or persistent memory 20 and 22 operably associated with server 12.

Server 12 receives a request (e.g., HTTP request, etc.) from at least one of application user's client computers 16, as represented in block 32. Assuming that data validation and transformation methods have been defined in the page table, server 12 validates the request data and transforms the request data to model, as represented in blocks 34 and 36, respectively.

Next, server 12 processes the request, as represented in block 38. As discussed in greater detail above, request processing includes but is not limited to processing request data, processing other data (e.g., maintaining or updating persistent database data 24), and external computer activity 18 such as e-mail or external application execution or other interaction.

In the event more than one process, is defined for a particular application page, context data is stored in volatile or persistent memory 26 and is accessible or otherwise passed from one process to another. The definition of context data is discussed in greater detail above.

Assuming the response to the request includes a data merge to a page template, the appropriate data is merged to the appropriate template as determined by the developer-defined page table 14. This step is represented in blocks 40 and 42. Additionally, response data is transformed into a model view format, as represented in block 44. Finally, the response is submitted to the requesting client computer 16.

As discussed in greater detail above, each page presented to an application user 16 in a response (e.g., HTTP response, etc.) contains imbedded tags identifying at least the current page. If, after receiving the response, the application user presents input to his or her browser selecting an available action to execute on the response page, as represented in block 48, the user's browser automatically sets an action tag for the page corresponding to the selected action, as represented in block 50. The response is now a request. Next, the request is presented to the server 12, where the request processing repeats, beginning with block 32.

Notably, updates to the page table, application pages, actions processes, applications, and templates can be made centrally and/or globally at server system 12.

Preferred and alternate embodiments of the present invention are particularly well suited for financial data management applications, including enterprise-wide Internet/intranet based financial data processing applications. Financial data processing applications that may benefit from the features and advantages of the present invention include but are not limited to accounting applications, credit account management applications, purchasing/account receivables applications, etc. Notably, those of ordinary skill in the art of application development will recognize that the advantages and features of the present invention may be readily applied to a wide variety of applications beyond financial data management.

While the best mode for carrying out the invention has been described in detail, those familiar with the art to which this invention relates will recognize various alternative designs and embodiments for practicing the invention as defined by the following claims.

What is claimed is:

1. A computer server-based method for defining and executing a client computer application, the method comprising:

defining a page table associated with a client computer application wherein the page table includes, for one or more application pages, a current page value, an action value, a process value and a next page value;

receiving a request from a client computer wherein the request includes request data, an indication of a current page value and an action value;

validating the request data;

transforming the request data into a model format for processing;

processing the transformed request data with a process wherein the process is defined in the page table as the process value corresponding to the current page value and action value received in the request;

transforming response data into a view format; and returning a response to the request wherein the response is defined in the page table as the next page value corresponding to the current page value and action value received in the request, and includes the transformed response data.

2. The method of claim 1 wherein the response includes merging response data with a predefined page template and wherein the template is defined in the page table.

3. The method of claim 1 wherein a data transformation method is defined in the page table.

4. The method of claim 1 wherein a data validation method is defined in the page table.

5. The method of claim 1 wherein more than one process value is defined for an application page.

6. The method of claim 5 wherein at least a portion of the response, request or intermediate processing data is stored in context and made available to more than one process.

7. The method of claim 1 wherein the client computer application is a financial data management application.

8. A client-server computer system for defining and executing one or more client computer applications, the system configured to:

receive input defining a page table associated with a client computer application wherein the page table includes, for one or more application pages, a current page value, an action value, a process value and a next page value;

receive input containing a request from a client computer wherein the request includes request data, an indication of a current page value and an action value;

validate the request data;

transform the request data into a model format for processing;

process the transformed request data wherein the process is defined in the page table as the process value corresponding to the current page value and action value received in the request;

transform response data into a view format; and present output to the client containing a response to the request wherein the response is defined in the page table as the next page value corresponding to the current page value and action value received in the request, and includes the response data.

9. The system of claim 8 wherein the computer system is additionally configured to merge the response data with a predefined page template and wherein the template is defined in the page table.

10. The system of claim 8 wherein a data transformation method is defined in the page table.

11. The system of claim 8 wherein a data validation method is defined in the page table.

12. The system of claim 8 wherein the computer system is additionally configured to execute more than one process, and wherein the more than one process to be executed is defined in the page table.

13. The system of claim 12 wherein the computer system is additionally configured to store at least a portion of the response, request or intermediate processing data in context and wherein the context data is available for more than one process.

14. The system of claim 8 wherein the client computer application is a financial data management application.

15. A server computer-based method for defining and executing a client computer application, the method comprising:

a step for defining a page table associated with a client computer application wherein the page table includes, for one or more application pages, a current page value, an action value, a process value and a next page value;

receiving a request from a client computer wherein the request includes data, an indication of a current page value and an action value;

processing the request data with a process wherein the process is defined in the page table as the process value corresponding to the current page value and action value received in the request; and returning a response to the request wherein the response is defined in the page table as the next page value corresponding to the current page value and action value received in the request, and includes response data.

* * * * *